(12) United States Patent
Yosomiya et al.

(10) Patent No.: US 7,495,834 B2
(45) Date of Patent: Feb. 24, 2009

(54) OPTICAL MEDIUM AND USE THEREOF

(75) Inventors: Takatoshi Yosomiya, Tokyo-To (JP); Yoichi Takahashi, Tokyo-To (JP); Masanori Akada, Tokyo-To (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 499 days.

(21) Appl. No.: 11/400,223

(22) Filed: Apr. 10, 2006

(65) Prior Publication Data

US 2006/0238872 A1    Oct. 26, 2006

(30) Foreign Application Priority Data

Apr. 21, 2005   (JP)   ............... 2005-123140
Aug. 2, 2005    (JP)   ............... 2005-223583

(51) Int. Cl.
*G02B 27/10*   (2006.01)
*G02B 27/46*   (2006.01)

(52) U.S. Cl. ...................... 359/626; 359/564
(58) Field of Classification Search ......... 359/618–626, 359/742, 564
See application file for complete search history.

(56) References Cited

FOREIGN PATENT DOCUMENTS

| JP | A-2001-166402 | 6/2001 |
|----|---------------|--------|
| JP | A-2004-007758 | 1/2004 |

*Primary Examiner*—Alicia M Harrington
(74) *Attorney, Agent, or Firm*—Oliff & Berridge, PLC

(57) ABSTRACT

An optical media is constructed by superimposing a Fourier transform lens film 3 including a Fourier transform lens 2 on which optical image 10 is formed, and a light permeating sheet 5 provided with a plurality of light permeating portions 4 through which light can pass in a point-like manner. Viewing incident light coming from the side of the light permeating sheet 5 through light permeating portions 4 with eyes on the side of Fourier transform lens film 3. Due to this, an optical image 10 can be formed on the Fourier transform lens 2.

12 Claims, 7 Drawing Sheets

OPTICAL MEDIUM AND USE THEREOF

BACKGROUND OF THE INVENTION

1. Field of the Invention

The present invention relates to an optical medium which can visualize an optical image using a Fourier transform lens, and to a method of observing the image using the Fourier transform lens having the optical image formed thereon.

2. Background Art

In the past, various premium products and post cards have been utilized as advertising media, and become recently important items used as tools, in particular, for promotion of new products and events.

Such tools tend to become less popular. Therefore, there is a need for something that has a new design and unpredictability and contributes to promotion activity.

For example, a post card with a photographic image, in which a lenticular lens is incorporated, has been proposed (e.g., see Patent Document 1).

However, in the case of such a post card with a photographic image, in which a lenticular lens is incorporated, a plurality of photographs to be projected must be prepared, and lenses corresponding to the number of photographs must be formed. This is problematic in taking a large cost.

As recently known advertising media, various products have been developed and proposed.

For example, advertisement of a product is carried out by providing a column for advertisement in a newspaper or magazine, and forming an expression of a printed image in the column, comprising characters, figures, patterns and the like, having a relation to a presentation of the product to be advertised, including a trade name, a trademark, a manufacturer, an explanation or the like.

Alternatively, advertisement is practiced by preparing leaflets or catalogs concerning a product, and distributing them to an unspecified large number of people to make the product printed thereon be widely known and attract public interest.

Moreover, in some cases, a product is advertised utilizing, for example, neon signs in a street, chiefly depending on the sense of sight, but in other cases, a product is advertised utilizing radios or broadcasting on the street or the like, mainly depending on a voice. Otherwise, such advertisement is sometimes carried out using televisions, chiefly depending on a voice and an image.

However, the advertisement depending on such advertising media is for advertising a product to an unspecified large number of people. Usually, each of them is not so much interested in the advertised product, even if he or she views or listens to it.

Recently, people have had tendency to exhibit strong dislike against noise and loudness caused by advertisement and thus be bored therewith. Accordingly, they probably avoid viewing or listening to advertisement of a product in which they are not so interested, and they would throw away leaflets or catalogs for the advertisement without taking a look. Therefore, such people do not pay any attention to advertisement of a product, and the effect of such advertisement cannot be expected.

Also, optical media by which optical images can be observed have been used as promotion media or toys for use in advertisement or promotions of new products.

Such an optical medium utilizes, for example, a Fourier transform lens, and is constructed so that it can visually show various optical images formed in advance thereon using light irradiation or the like and the user can observe and enjoy the images (e.g., see Patent Document 2).

In an optical media utilizing a conventional Fourier transform lens, when observing an optical image formed on the Fourier transform lens with eyes, the Fourier transform lens must be irradiated with light emitted from a point light source on the side opposite to the side on which the user is observing the image with his eyes.

As such a point light source, for example, the sun, a candle, a spot light, fireworks or the like can be used. However, if viewing the Fourier transform lens while holding the lens toward the sun, there is a significant risk of damaging the eyes due to too strong light.

Especially, in a case where a medium using such a Fourier transform lens is utilized for distribution to children, a measure must be taken to prevent accidents, such as by printing on the medium a note for instructing or warning the children not to observe the Fourier transform lens while directing it toward the sun.

However, it is probable that the children will not become aware of the note or cannot read it, or otherwise it is possible that they will use the Fourier transform lens aimlessly or unintentionally directing it toward the sun. Thus, a risk that a user takes an inappropriate use of the lens still remains.

To attract interest of consumers, it is effective to use a new optical medium utilizing a Fourier transform lens as a means for promotion. However, a process for laminating a sheet having a Fourier transform lens formed thereon onto a sheet having information for advertisement printed thereon must be carried out, thereby requiring significant time, labor and cost. Accordingly, it is currently difficult to readily use a medium utilizing a Fourier transform lens as a means for advertisement.

Documents Cited:
Patent Document 1: TOKUKAI No. 2001-166402, KOHO
Patent Document 2: TOKUKAI No. 2004-7758, KOHO

SUMMARY OF THE INVENTION

The present invention provides an optical medium which enables a user to enjoy its optical image repeatedly, and which can be used even by children without special care, and produced at a low cost even as an advertising medium. The present invention also provides a method of observing an optical image, which enables observation of an optical image without a need of looking for a point light source.

The present invention is an optical medium, comprising a Fourier transform lens film including a Fourier transform lens on which an optical image is formed and which can provide visual confirmation of the optical image when light permeates the Fourier transform lens, and a light permeating sheet arranged on the incident light side of the Fourier transform lens film and including a plurality of light permeating portions through which light can pass in a point-like manner.

The present invention is an optical medium, wherein the Fourier transform lens film and the light permeating sheet are constructed separately.

The present invention is an optical medium, wherein the Fourier transform lens film and the light permeating sheet are adhered together.

The present invention is an optical medium, wherein the light permeating sheet has a recess on one surface, and the Fourier transform lens film is detachably fitted in the recess.

The present invention is an optical medium, wherein the Fourier transform lens film is fixed in the recess of the light permeating sheet by a pressing sheet.

The present invention is an optical medium, wherein at least one of the light permeating sheet and the Fourier transform lens film includes advertising information provided thereon.

The present invention is an optical medium, wherein the advertising information provided on the light permeating sheet or the Fourier transform lens film is related to the contents of the optical image on the Fourier transform lens.

The present invention is an optical medium, wherein the Fourier transform lens film and the light permeating sheet are linked together at their end portions by a linking member.

The present invention is an optical medium, wherein the linking member comprises a ring-like linking member.

The present invention is an optical medium, wherein either of the Fourier transform lens film and the light permeating sheet is of a rectangular shape, and four corners of the Fourier transform lens film and the light permeating sheet are formed into a rounded shape.

The present invention is an optical medium, wherein either of the Fourier transform lens film and the light permeating sheet has a thickness of from 80 to 2000 μm and a shape retaining ability.

The present invention is a method of using an optical medium comprising a Fourier transform lens film including a Fourier transform lens on which an optical image is formed and which can provide visual confirmation of the optical image when light permeates the Fourier transform lens, and a light permeating sheet arranged on the incident light side of the Fourier transform lens film and including a plurality of light permeating portions through which light can pass in a point-like manner; the method comprising the steps of: providing the Fourier transform lens, and the light permeating sheet arranged on the incident light side of the Fourier transform lens film; and observing the optical image formed on the Fourier transform lens of the Fourier transform lens film with eyes on the side of the Fourier transform lens film by utilizing incident light on the side of the light permeating sheet.

Since the optical medium of the present invention is used by superimposing the Fourier transform lens film and the light permeating sheet when observing an optical image formed on the Fourier transform lens, the user can observe and enjoy the optical image repeatedly. In addition, even children can use it without any special care, and such an optical medium can be produced at a low cost even as an advertising medium.

Moreover, since the optical medium of the present invention comprises a Fourier transform lens film and a light permeating sheet each having four corners formed into a rounded shape, even children can use it without any special care.

The optical medium of the present invention has a thickness of from 80 to 2000 μm and a shape-retaining ability. Therefore, the user can observe and enjoy its optical image repeatedly.

DETAILED DESCRIPTION OF THE INVENTION

First Embodiment

An optical media and its use according to a first embodiment of the present invention will be described below in detail with reference to the drawings.

Figure 1:
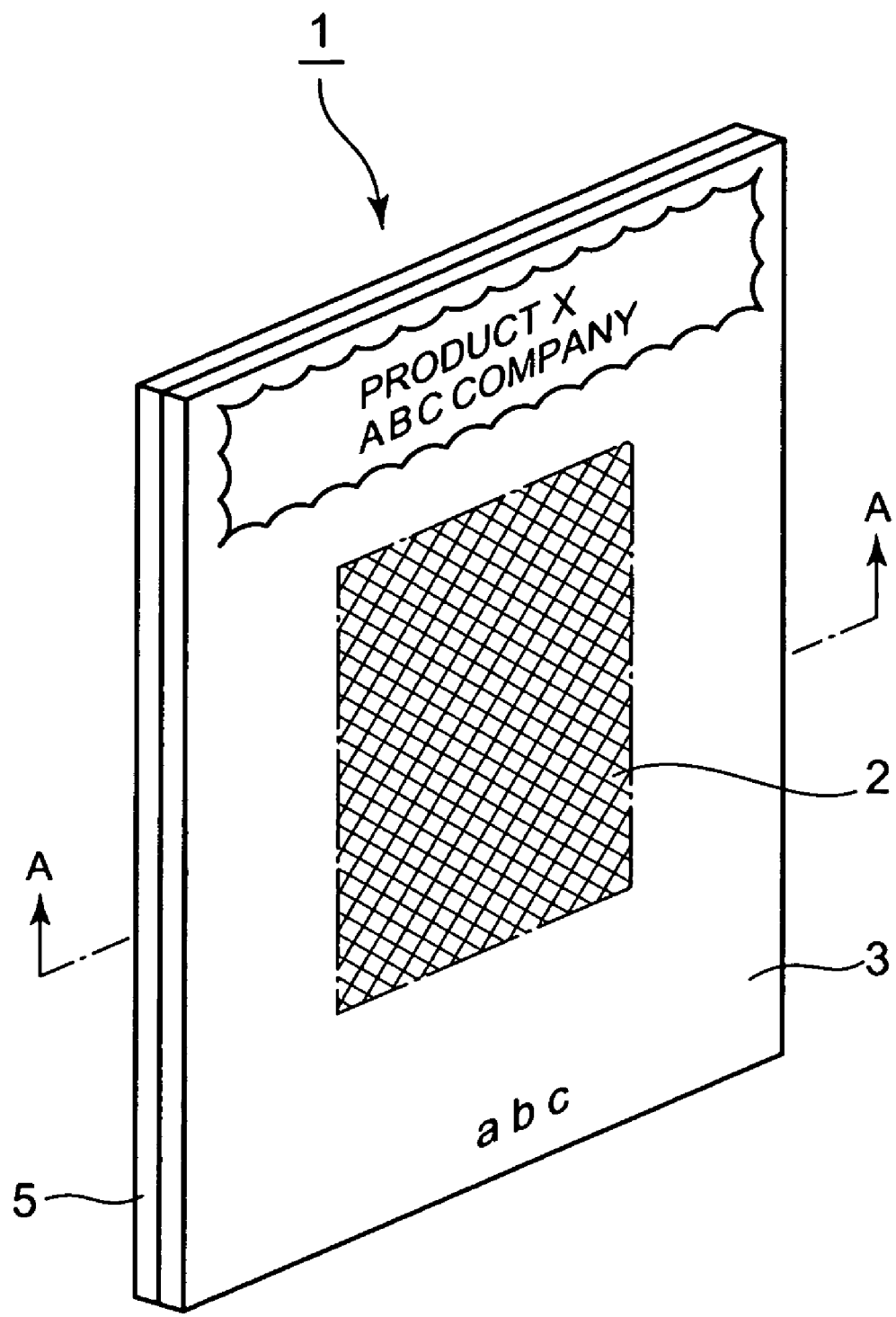
FIG. 1 is a perspective view of an optical medium according to a first embodiment of the present invention.
Figure 2:
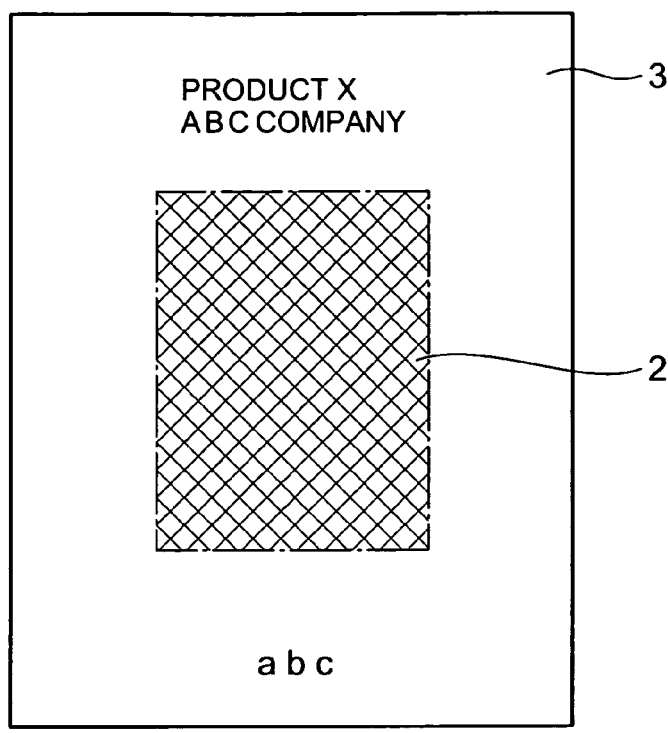
FIG. 2 is a plan view of a Fourier transform lens film used in the optical medium of the present invention.
Figure 3:
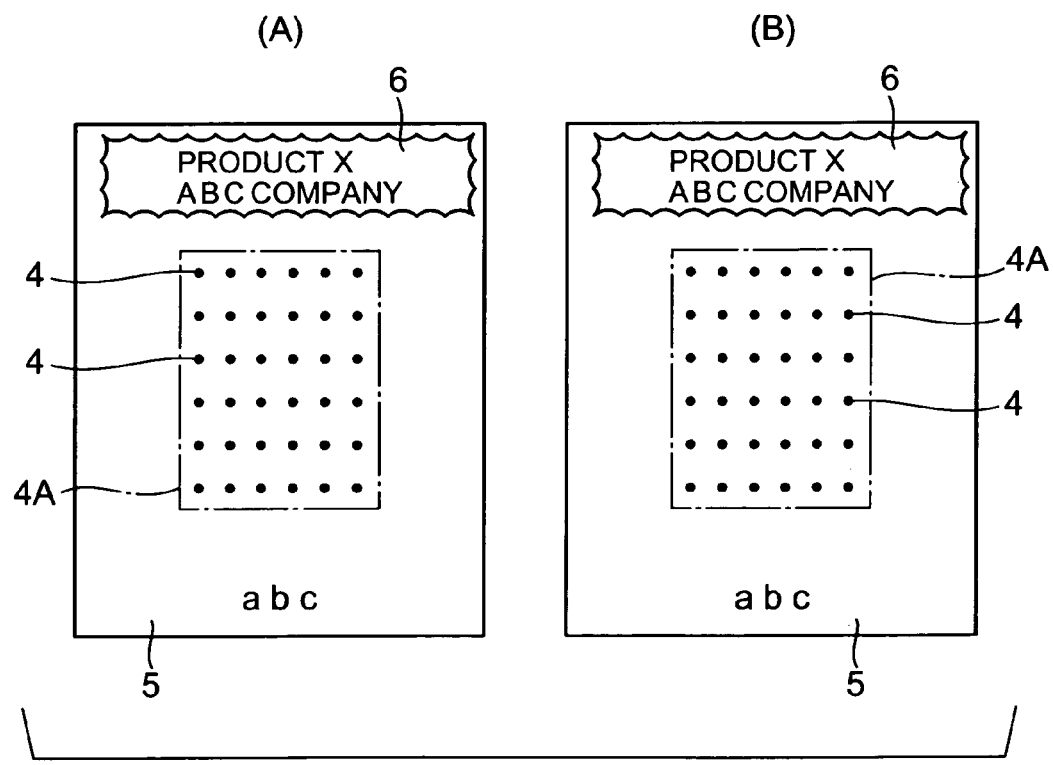
FIG. 3(A) is a plan view of a front side of a light permeating sheet used in the optical medium of the present invention.
FIG. 3(B) is a plan view of a rear side of the light permeating sheet.
Figure 4:
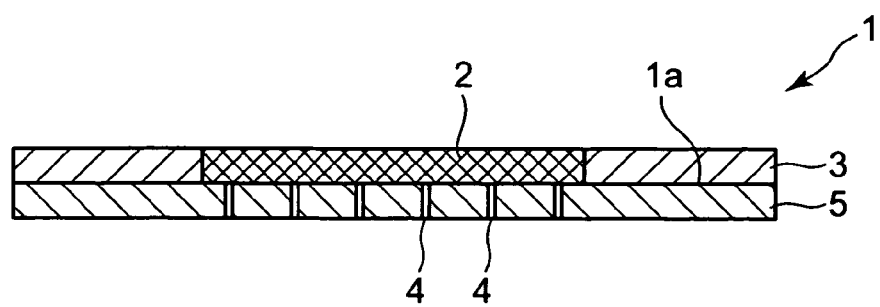
FIG. 4 is a cross-section taken along line A-A of FIG. 1.
Figure 5:
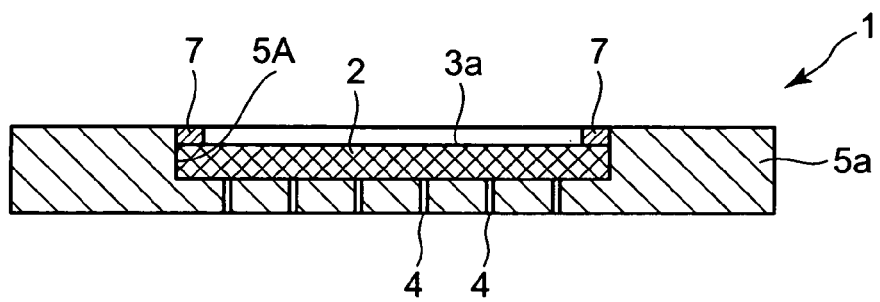
FIG. 5 is a cross-section of a variation of the optical medium according to the present invention.
Figure 6:
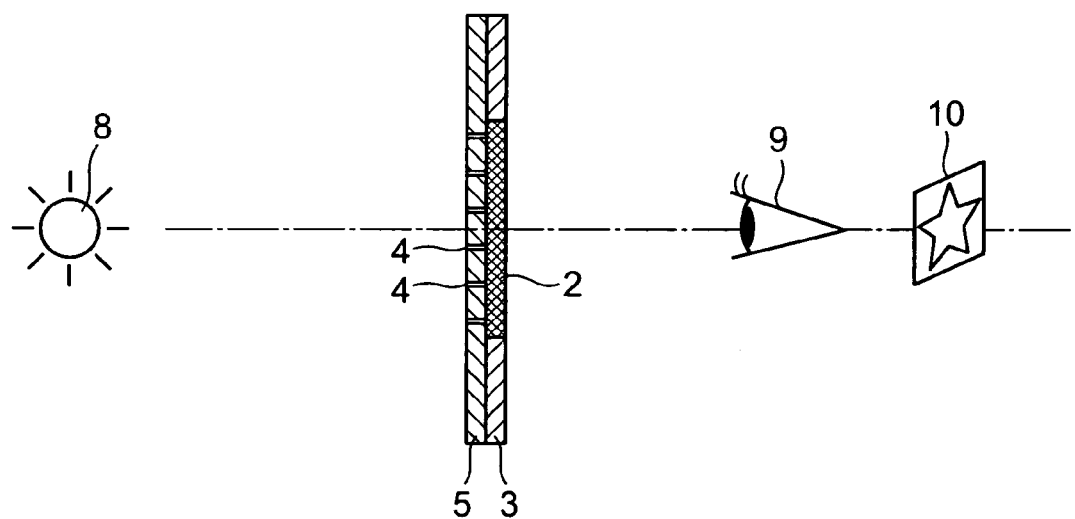
FIG. 6 is an explanatory view for illustrating a method of observing an optical image using an optical medium of the present invention.
Figure 7:
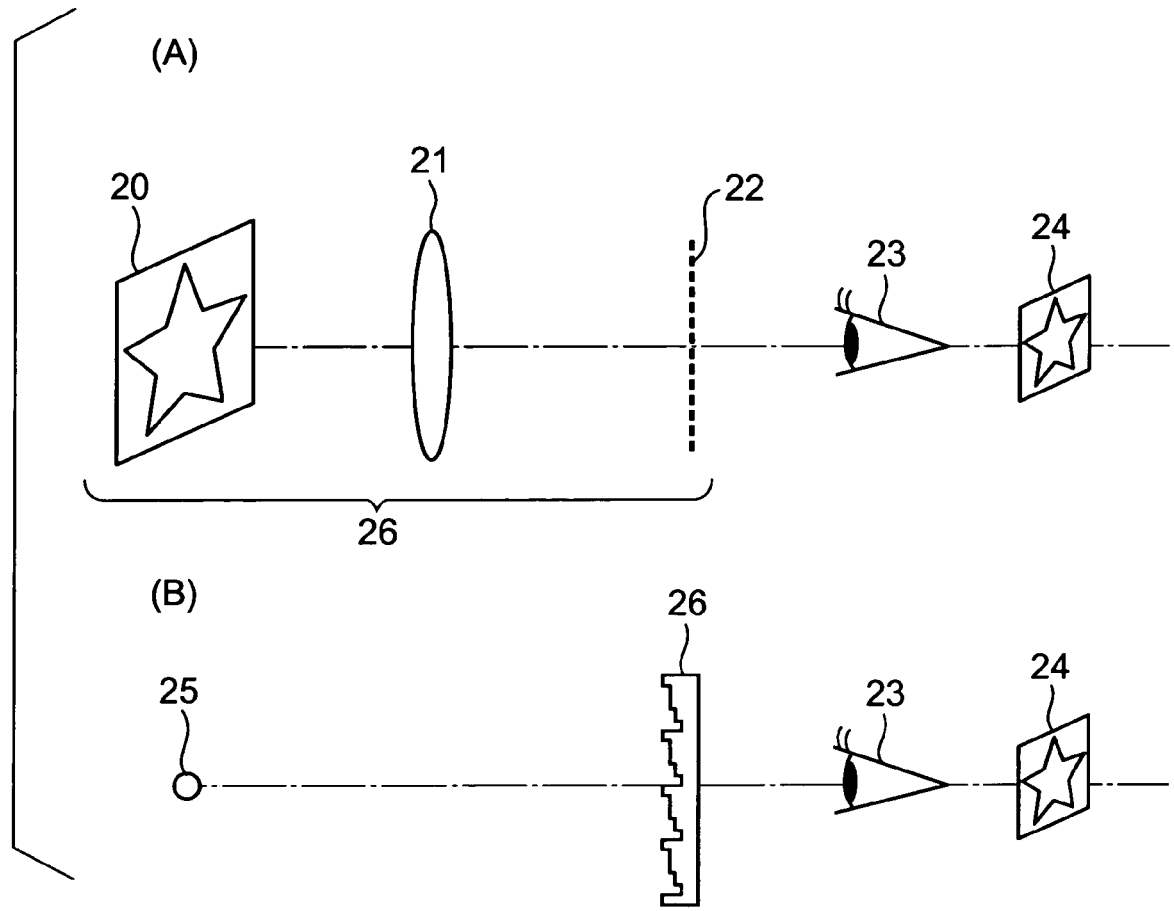
FIGS. 7(A) and 7(B) are explanatory views for illustrating the principle of the Fourier transform lens, respectively.
Figure 8:
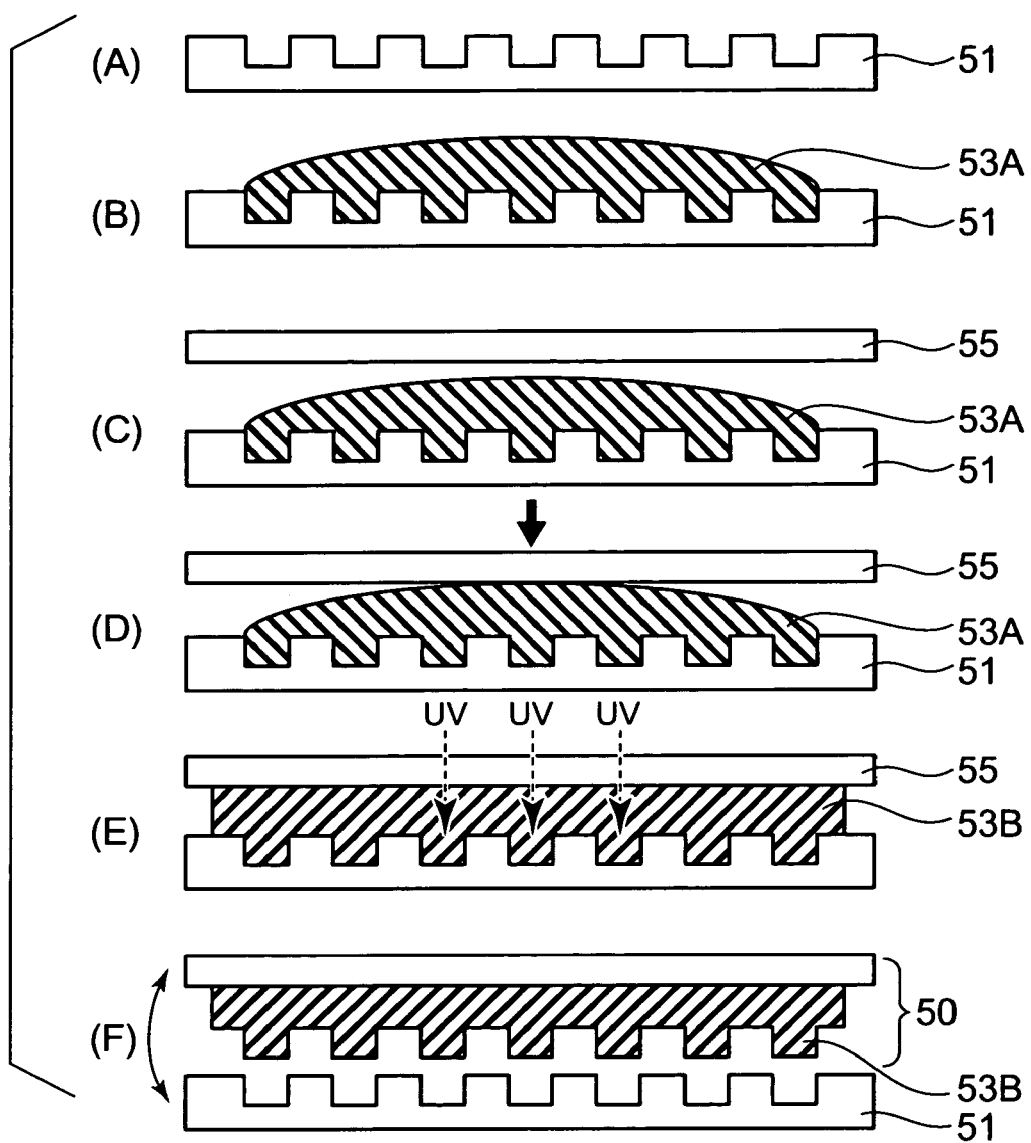
FIGS. 8(A) to 8(F) are schematic views for illustrating the 2P method, respectively.
Figure 9:
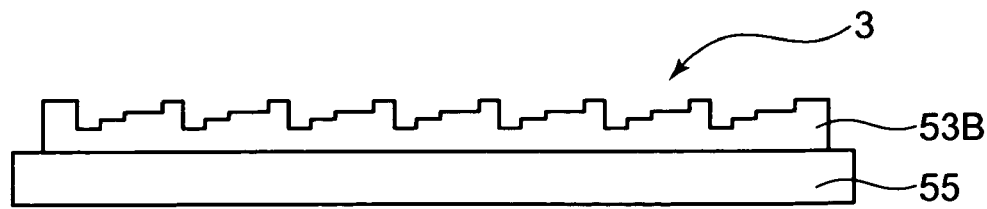
FIG. 9 is a cross-section of a reproduced Fourier transform lens.

FIG. 1 is a perspective view of an optical medium according to a first embodiment of the present invention, FIG. 2 is a plan view of a Fourier transform lens film used in the optical medium of the present invention, FIG. 3 shows a light permeating sheet used in the optical medium of the present invention, wherein FIG. 3(A) is a plan view of a front side of the light permeating sheet, and FIG. 3(B) is a plan view of a rear side of the light permeating sheet, FIG. 4 is a cross-section taken along line A-A of FIG. 1, FIG. 5 is a cross-section of a variation of the optical medium according to the present invention, FIG. 6 is an explanatory view for illustrating a method of observing an optical image using an optical medium of the present invention, FIG. 7 is an explanatory view for illustrating the principle of the Fourier transform lens, FIG. 8 is a schematic view for illustrating the 2P method, and FIG. 9 is a cross-section of a reproduced Fourier transform lens.

As shown in FIG. 1 to FIG. 3, an optical medium 1 according to a first embodiment of the present invention comprises a Fourier transform lens film 3 having a Fourier transform lens 2 on which an optical image 10 is formed and by which the optical image 10 can be viewed when light permeates the lens, and a light permeating sheet 5 which is arranged on the incident light side of the Fourier transform lens film 3 and has a plurality of light permeating portions 4 formed therein through which light can pass in a point-like manner.

On the Fourier transform lens 2, concavo-convex portions are formed so that an optical image can be observed at the Fourier transform lens 2 under predetermined conditions.

The Fourier transform lens 2 may be provided in a predetermined area of the Fourier transform lens film 3, or in the whole surface of the Fourier transform lens film 3.

In the illustrated example, an embodiment is shown where the Fourier transform lens 2 is provided in a central area of the transparent sheet 3.

Also, as shown in FIG. 3, the plurality of light permeating portions 4, each enabling light to pass through in a point-like manner, are provided in the light permeating sheet 5.

The light permeating portion forming area 4A in which the plurality of light permeating portions 4 are formed, is arranged in a place where the Fourier transform lens 2 and the light permeating portion forming area 4A including the light permeating portions 4 will be laid on each other when the Fourier transform lens film 3 and the light permeating sheet 5 are superimposed together.

In addition, the light permeating sheet 5 has advertising information 6 provided on its one or both sides.

Such advertising information 6 may be indicated when optical medium 1 is used as an advertising medium, and for further enhancement of the advertising effect, the contents of the optical image 10 which can be observed using the Fourier transform lens 2 may be related to the contents of advertising information 6.

Thus, when the optical medium 1 is distributed to a consumer as an advertising medium, it can show not only the advertising information indicated thereon by simply printing or the like means, but also the advertising information which will be visualized on the Fourier transform lens 2, thereby providing a novel impression to the consumer and enhancing the advertising effect. In this case, the advertising information 6 may be indicated on one or both sides of the Fourier transform lens film 3.

Each of the light permeating portions 4 of the light permeating sheet 5 is a fine aperture which is so formed that light can permeate the light permeating sheet 5 in a point-like manner. Providing such a plurality of fine apertures allows light emitted from a light source to be changed into points of light and enables to irradiate the Fourier transform lens 2 with so changed points of light.

Additionally, the light permeating portions 4 may be holes other than fine apertures, provided that light can permeate the light permeating sheet 5 in a point-like manner and the Fourier transform lens 2 can be irradiated with points of light. For example, the light permeating portions 4 may be provided by using a base material having a transparency as light permeating sheet 5, printing entirely at least one side of the base material with a dark color, especially a black color, to make it nontransparent, and forming light permeating portions through which light can pass in a point-like manner at predetermined positions of the entirely printed side.

Printing the side having small holes or apertures with a black color reduces reflection of light, thus providing more distinct points of light.

The Fourier transform lens 2 comprises fine concavo-convex portions to obtain a desired optical image 10 when viewing a point light source through Fourier transform lens 2. If using Fourier transform lens 2 alone, the optical image 10 cannot be observed unless utilizing or looking for a point light source, such as the sun, a candle, a spot light, fireworks or the like.

However, with the optical medium 1 of the present invention, since light can be changed into points of light by means of the light permeating portions 4 of the light permeating sheet 5, the optical image 10 can be observed without using any special point light source.

The light permeating sheet 5 may be those commonly known. A cardboard used as a base material of the sheet can provide abilities to maintain the structural integrity and rigidity to the sheet. Such a cardboard includes white cardboards, manila cardboards, high-grade cardboards, corrugated cardboards or the like.

Preferably, the cardboard has a basic weight ranging from 80 to 1000 g/m$^2$, more preferably from 100 to 400 g/m$^2$.

In the base paper, one or more the light permeating portions 4 are provided, having a diameter ranging from 50 μm to 1 mm, preferably from 0.1 to 0.5 mm. Depending on the diameter, it is preferred that the number of light permeating portions 4 ranges from 3 to 50 per square centimeter.

In the present invention, the light permeating sheet 5 may be fabricated using the base paper in combination with various resinous films or sheets.

For example, various plastic films or sheets can be fabricated by using publicly-known molding resins, such as polyethylene resins, polypropylene resins, ethylene-propylene copolymers, polyvinyl chloride resins, polyacrylonitrile resins, polystyrene resins, polycarbonate resins, acrylonitrile-styrene copolymers (AS resins), acrylonitrile-butadiene-styrene copolymers (ABS resins), polyester resins, polyamide resins or the like, and utilizing a publicly known molding method, such as injection molding, extrusion molding, thermoforming such as vacuum pressure air molding, blow molding and the like.

Of course, the light permeating sheet 5 can be made as a laminate by laminating the cardboard as a base layer with the aforementioned various films or sheets.

FIG. 4 is a cross-section showing a method of superimposing the Fourier transform lens film 3 with the Fourier transform lens of the optical medium according to the first embodiment and the light permeating sheet 5 together.

Alternatively, the Fourier transform lens film 3 and the light permeating sheet 5 may be bonded together using adhesive 1a, a gluing agent or hot-melting, or integrally fixed using an adhesive tape, a double-sided tape, a stapler or the like.

FIG. 5 is a cross-section showing a method of superimposing a Fourier transform lens film 3a and a light permeating sheet 5a in a variation of the optical medium.

In the example shown in FIG. 5, a rectangular recess 5A is formed in the light permeating sheet 5a, and the Fourier transform lens film 3a is fitted in the recess 5A. Further by fitting a frame-like pressing sheet 7 in a space over the Fourier transform lens film 3a, the Fourier transform lens film 3a and light permeating sheet 5a are detachably integrated together.

In this example, since a plurality of light permeating portions 4a, through which light can pass in a point-like manner, are provided in the bottom of the rectangular recess 5A of the light permeating sheet 5a, a Fourier transform lens 2 can be irradiated with points of the light passing through the light permeating portions 4a.

In the structure shown in FIG. 5, the Fourier transform lens film 3a may be detached from the light permeating sheet 5a to use the Fourier transform lens 3a alone.

Referring now to FIG. 6, a method of observing an optical image according to the present invention will be described.

The method of observing an optical image of this invention comprises superimposing the Fourier transform lens film 3 including the Fourier transform lens 2 on which an optical image is formed, and the light permeating sheet 5 provided with the plurality of light permeating portions 4 through which light emitted from light source 8 can pass in a point-like manner. By viewing on the side of the Fourier transform lens film 3 with eyes 9 the light emitted on the side of the superimposed light permeating sheet 5 through the light permeating portions 4, the optical image 10 formed on the Fourier transform lens 2 can be observed.

In the method of observing an optical image according to the present invention, when observing the optical image formed on the Fourier transform lens 2, the Fourier transform lens film 3 including the Fourier transform lens 2 on which an optical image is formed and the light permeating sheet 5 provided with the plurality of light permeating portions 4 through which light emitted from light source 8 can pass in a point-like manner, are superimposed together. Therefore, without using any special point light source, a state in which Fourier transform lens 2 is irradiated with light emitted from a point light source can be created, thus eliminating preparing for any point light source as in the conventional cases.

In the above case, the Fourier transform lens film 3 and the light permeating sheet 5 may be superimposed and adhered integrally, or otherwise they may be incorporated separately.

FIG. 7 is an explanatory view for illustrating the principle of the Fourier transform lens.

(Fourier Transform)

FIG. 7(A) is a view for explaining observation with eyes, in which an image 24 is observed when viewing a targeted image 20 with human's eyes 23 through a lens 21.

FIG. 7(B) shows a case in which an optical image 27, which corresponds to respective concavo-convex portions on a Fourier transform lens 26, can be observed by viewing a point light source 25 with human's eyes 23 through a Fourier transform lens 26 placed on a Fourier transform plane 22.

For example, the star-shaped optical image 27 can be observed, by providing concavo-convex portions to regenerate such a star-shaped image as shown in FIG. 7(B) in the Fourier transform film.

Namely, the configuration made by arranging the image 20 and the lens 21 on the Fourier transform plane 22 corresponds to the Fourier transform lens 26 located on the Fourier transform plane 22.

(Fourier Transform Lens Film)

A method of forming Fourier transform lens 3 may be a publicly known method, and comprises first forming an original plate corresponding to a desired image.

After decision of the desired image, image data are formed, followed by calculating Fourier transform data based on the position of a Fourier transform plane and the like, and then converting the Fourier transform data into a binary form, and finally transforming the obtained data into rectangular data for electron beam depiction.

Next, the rectangular data are transferred to a resist film coated on a glass plate using an electron beam depicting device for depicting a semiconductor circuit mask or the like.

By reproduction using the obtained glass original plate, large amounts of Fourier lens film 3 including the Fourier transform lens 2 can be formed.

As the reproducing method, the publicly known 2P method, the injection molding, the sol-gel method and the like can be applied.

(2P Method)

The 2P (Photo-Polymerization) method comprises coating an ionizing-radiation-curable resin over an original plate, curing the resin by irradiation with an ionizing radiation, and peeling off the cured film.

The 2P method is generally known as a method effective for forming concavo-convex reliefs on a base material, and is also used for reproducing publicly known optical parts or the like.

FIG. 8 is a schematic view for illustrating the 2P method.

FIG. 9 is a cross-section of a reproduced Fourier transform lens film of the present invention.

In an outline of the 2P method as shown in FIG. 8, an original plate 51 having concavo-convex reliefs is formed first as shown in FIG. 8(A). Next, as shown in FIG. 8(B), an ionizing-radiation-curable resin composition 53A is dropped onto an original plate 51. Thereafter, as shown in FIGS. 8(C) and 8(D), a reproducing base material 55 is laid on the resin composition 53A and then pressed against the original plate 51.

Subsequently, as shown in FIG. 8(E), irradiation with an ionizing radiation, such as an ultraviolet ray or the like, is carried out on the side of the original plate 51 or the reproducing base material 55 to cure ionizing-radiation-curable resin composition 53B.

Finally, as shown in FIG. 8(F), a reproduced article 50 (i.e., Fourier transform lens film 3) is obtained by peeling off the cured and integrated ionizing-radiation-curable resin 53B together with the base material 55 from original plate 51.

Further, by carrying out the above 2P method repeatedly a plurality of reproduced articles can be produced.

For simplifying the explanation, the formation of the concavo-convex reliefs is shown in FIG. 8 such that they are formed to have rectangular concavo-convex shapes.

Alternatively, these concavo-convex shapes may have stepped shapes as shown in FIG. 9 by transforming them into a binary or quaternary form.

(Base Material)

The base material 55 for the reproduced article 50 may be transparent one, specifically a glass plate or transparent plastic film or sheet.

Since glass breaks easily, transparent plastic films or sheets are preferred.

As the transparent plastics, polycarbonates and polyethylene terephthalates are preferred, and polycarbonates are most preferable for their double reflection properties.

In respect of handling properties, the thickness of the base material is in the range from about 0.05 to 5 mm, preferably from about 0.1 to 3 mm.

(Ionizing-Radiation-Curable Resin)

The ionizing-radiation-curable resin layer 53B for providing the shapes of concavo-convex reliefs of the original plate is cured by irradiation with an ionizing radiation onto the ionizing-radiation-curable resin composition 53A.

While the ionizing radiation is classified by quantum energy of electromagnetic waves, as used herein, it is defined to include all of ultraviolet rays (UV-A, UV-B, UV-C), visible light, gamma rays, X rays, and electron beams.

Accordingly, as the ionizing radiation, ultraviolet rays (UV), visible light, gamma rays, X rays or electron beams can be used, but ultraviolet rays or electron beams are preferable.

For forming the ionizing-radiation-curable resin composition 53A to be cured with an ionizing radiation, a photopolymerization initiator and/or a photopolymerization accelerator is added to the ionizing-radiation curable resin (precursor) for the ultraviolet-ray curing, but no addition may be selected if relatively high energy electron-beam curing is employed.

If a proper catalyst is used, the curing may also take place with heat energy.

The ionizing-radiation-curable resin layer 53B is formed of ionizing-radiation-curable resin composition 53A cured with an ionizing radiation. Therefore, this ionizing-radiation-curable resin composition 53A may contain a curable ingredient having at least one functional group which causes a polymerization reaction (also referred to as curing) with an ionizing radiation.

As the curable ingredient, compounds having radically polymerizing unsaturated double bonds can be used, including monofunctional monomers, multifunctional monomers, such as bi- or more functional monomers, functional oligomers, functional polymers, and the like.

The functional group which causes a polymerization reaction (also referred to as curing) includes acryloyl groups, methacryloyl groups, allyl groups, or epoxy groups.

As the monofunctional monomers, for example, (meth) acrylic acid or alkyl or allyl esters thereof, such as acrylic acid, methyl acrylate, or ethyl acrylate, styrene, methylstyrene, styrene-acrylonitrile, or n-vinylpyrrolidone can be utilized.

As used herein, (meth)acrylic acid refers to acrylic acid or methacrylic acid.

Also, (meth)acrylates refers to acrylates or mechacrylates, and this is the case in such similar expressions.

As the bifunctional monomers, for example, 1,6-hexanediol acrylate (HDDA), hexamethylene diacrylate, diethylene glycol diacrylate (DEGDA) can be used.

As the multifunctional monomers, bi- or more functional (meth)acryloyl monomers obtained by reacting (meth)acrylic acid or derivatives thereof with bi- or more functional compounds, such as ethylene glycols, glycerin, pentaerythritol, or epoxy resins can be utilized. For example, trimethylolpropane acrylate (TMPTA), pentaerythritol triacrylate (PETA) or the like can be mentioned.

As the functional oligomers (also referred to as prepolymers), polyurethanes, polyesters, polyethers, polycarbonates, or poly(meth)acrylic esters, having a molecular weight (weight-average molecular weight) ranging from about 300 to 5,000 and including radically polymerizing double bonds in the molecule, such as acryloyl groups, methacryloyl groups, allyl groups, or epoxy groups, can be utilized. For example, urethane(meth)acrylates, isocyanurate(meth)acrylates, polyester(meth)acrylates or the like can be mentioned.

As the functional polymers, urethane(meth)acrylates, isocyanurate(meth)acrylates, polyester-urethane(meth)acrylates, or epoxy(meth)acrylates, having a molecular weight (weight-average molecular weight) ranging from about 1,000 to 300,000 and including radically polymerizing double bonds, such as acryloyl groups, methacryloyl groups, allyl groups, or epoxy groups, can be used.

The aforementioned curable monomers, and/or oligomers, and/or polymers may be contained in the ionizing-radiation-curable resin composition 53A.

Ionizing radiation curability can be generated by adding such curable ingredients to the ionizing-radiation-curable resin (precursor) in an amount of 5% by weight or more, preferably 10 to 90% by weight, more preferably 20 to 80% by weight, of the resin.

The ionizing-radiation-curable resin (precursor) may contain at least one monomer as well as a monomer referred to as a reactive diluent. Such a monomer is a monofunctional reactive diluent having (meth)acryloyl groups, methacryloyl groups, allyl groups, or epoxy groups.

Unlike typical organic solvents, such as toluene or the like, the reactive diluent refers to a reagent not containing such a commonly-used organic solvent, including toluene or the like.

Usually, the ionizing-radiation-curable resin composition has a high viscosity, therefore it cannot be coated without adjusting its viscosity using a suitable organic solvent.

However, addition of the aforementioned monomer to the ionizing-radiation-curable resin (precursor) can reduce its viscosity, thus eliminating a need of using a solvent, and enabling to use the monomer in a non-solvent state.

Also, oligomers have similar effects.

Additionally, such monomers and oligomers increase the polymerizing reaction rate, and these materials can adjust the cross-linking density and cohesive power of the ionizing-radiation-curable resin layer 53B after it has been cured.

For this reason, it is preferred to use the ionizing-radiation-curable resin (precursor) along with appropriate monomers, oligomers, and/or polymers.

Moreover, it is preferred to use them in combination, suitably changing the combining ratio, in order to obtain the ionizing-radiation-curable resin layer 53B having a performance which meets the conditions of use and purpose.

Additives, such as polymerization prohibition agents and aging prevention agents, may be added to the ionizing-radiation-curable resin (precursor), as needed. Also, additives, including plasticizers, lubricants, colorants, such as dyes or pigments, fillers, such as extenders or resins, for increase in quantity or blocking prevention, surfactants, antifoams, leveling agents, thixotropy-rendering agents, may be optionally added to the ionizing-radiation-curable resin layer 53B, as desired.

Electron-beam irradiation uses an electron beam generated by an electron-beam accelerator.

For example, electron-beam irradiation devices use various electron-beam accelerators, including a Cockcroft-Walton type, a van de Graft type, a resonance transformer type, an insulation-core transformer type, a linear type, a Dynamitron type, and a radio-frequency type, to generate electron beams in an electron curtain mode or beam scanning mode.

Preferably, the irradiation device is a type of "Electron Curtain" (trade name) which can generate a uniform electron beam in a curtain-like mode from a linear filament.

The electron-beam irradiation is carried out in an irradiation amount of 0.5 to 20 Mrad, with irradiation of electrons having energy of usually from 100 to 1000 keV, preferably from 100 to 300 KeV.

If the irradiation amount is less than 0.5 Mrad, unreacted monomers may remain and the curing may be insufficient. If the irradiation amount exceeds 20 Mrad, the cross-linking density tends to be significantly high, and the resultant cured binder or base material may tend to be damaged.

The curing is conducted in an atmosphere which is maintained lower than 500 ppm oxygen concentration. Usually it is preferred to carry out the reaction at approximately 200 ppm oxygen concentration.

(Photopolymerization Initiator)

For the ultraviolet-ray irradiation, a photopolymerization initiator, such as acetophenone type initiators, benzophenone type initiators, Michler's benzoyl benzoates, α-amyloxime esters, tetramethylthiuram monosulfide, thioxanthene type intiators, and if necessary, a photosensitizer, such as n-butylamine, triethylamine, tri-n-butylphosphine, are added to the ionizing-radiation-curable resin composition.

As the ultraviolet-ray (UV) lamp used for the ultraviolet-ray curing, high pressure mercury lamps or metal-halide lamps can be used, and the wave length of the ultraviolet ray may be selected, depending on the adhesive composition, within a range of from 200 to 400 nm.

The irradiation amount may be determined depending on the quality of the adhesive composition, the output of the UV lamp, and the processing speed.

While the reproduced article 50, or the Fourier transform lens film 3 including the Fourier transform lens 2 can exhibit a function even if used directly after prepared in the above-described manner, it may be reinforced with a thick cardboard on its periphery in order to enhance properties for attaching to the light permeating sheet 5 or handling it alone.

Since the properties of the Fourier transform lens 2 is lowered when a liquid, such as water, sweat, or oil, is attached to its concavo-convex surface, a protective layer or film may be provided on that concavo-convex surface.

EXAMPLES

Example 1-1

Employing a "star-shaped" optical image shown in FIG. 7(B) as a desired image, the desired image was transferred to an original plate 51 by depicting concavo-convex portions of Fourier transform lens 2 using an electron-beam depiction method.

Using the processed original plate 51, the concavo-convex portions of this plate were reproduced by the 2P method.

Next, an ionizing-radiation-curable resin 53A as described below was poured into the concavo-convex portions of the original plate 51, followed by laying a polycarbonate sheet base material 55 with a thickness of 1 mm on the resin, applying pressure of 60 N/cm$^2$ to the base material, and spreading the resin wider than the area of concavo-convex relieves.

After irradiating the original plate 51 on the side of polycarbonate base material 55 with an ultraviolet ray having a wave length of 365 nm from a high pressure mercury lamp in a radiation dose of 350 mJ, the cured resin film was peeled off to obtain Fourier transform lens sheet 3.

Ionizing-Radiation-Curable Resin

| | |
|---|---|
| Gocerac UV-7500 B (produced by Nippon Gousei Kagaku Co., ltd.) | 35 parts by weight |
| 1,6-hexanediol diacrylate | 35 parts by weight |
| dipentaerythritol triacrylate | 10 parts by weight |
| vinylpyrrolidone | 15 parts by weight |
| 1-hydroxycyclohexyl phenyl ketone | 2 parts by weight |
| benzophenone | 2 parts by weight |
| TSF 4440 (produced by GE-Toshiba Silicone Co., ltd.) | 1 part by weight |

The Fourier transform lens film 3 produced as mentioned above had a card-like shape having outer dimensions of 57×87 mm, including a central 30×50 mm Fourier transform lens 2 and a plain non-lens portion surrounding the lens 2.

Next, a cardboard having outer dimensions of 57×87 mm and a basic weight of 200 g/m$^2$ was prepared, and light permeating portions 4 were made in the cardboard by forming 50 holes having a diameter of 0.2 mm over the central 30×50 mm portion.

Thereafter, the entire surface of the 30×50 mm area 4A of the light permeating portions 4 was printed with a black color, followed by printing handling instructions concerning the specific article on the remaining portions, other than the central area 4A of the light permeating portion 4, then printing on the opposite side corporate advertisements including printed advertising information, comprising characters, figures, symbols, patterns and the like for advertising other articles having no relation to the specific article, thus producing light permeating sheet 5.

Subsequently, the superimposing Fourier transform lens sheet 3 having a plain non-lens portion (13.5 mm in width) and the light permeating sheet 5 to obtain an optical medium 1 having outer dimensions of 57×87 mm, as a card-like advertising medium.

When viewing a fluorescent light coming through the light permeating portions 4 of the light permeating sheet 5 from the Fourier transform lens film 3, a plurality of star-shaped images were observed twinkling.

Second Embodiment

An optical medium according to a second embodiment of the present invention will be described below in detail with reference to the drawings.

Figure 10:
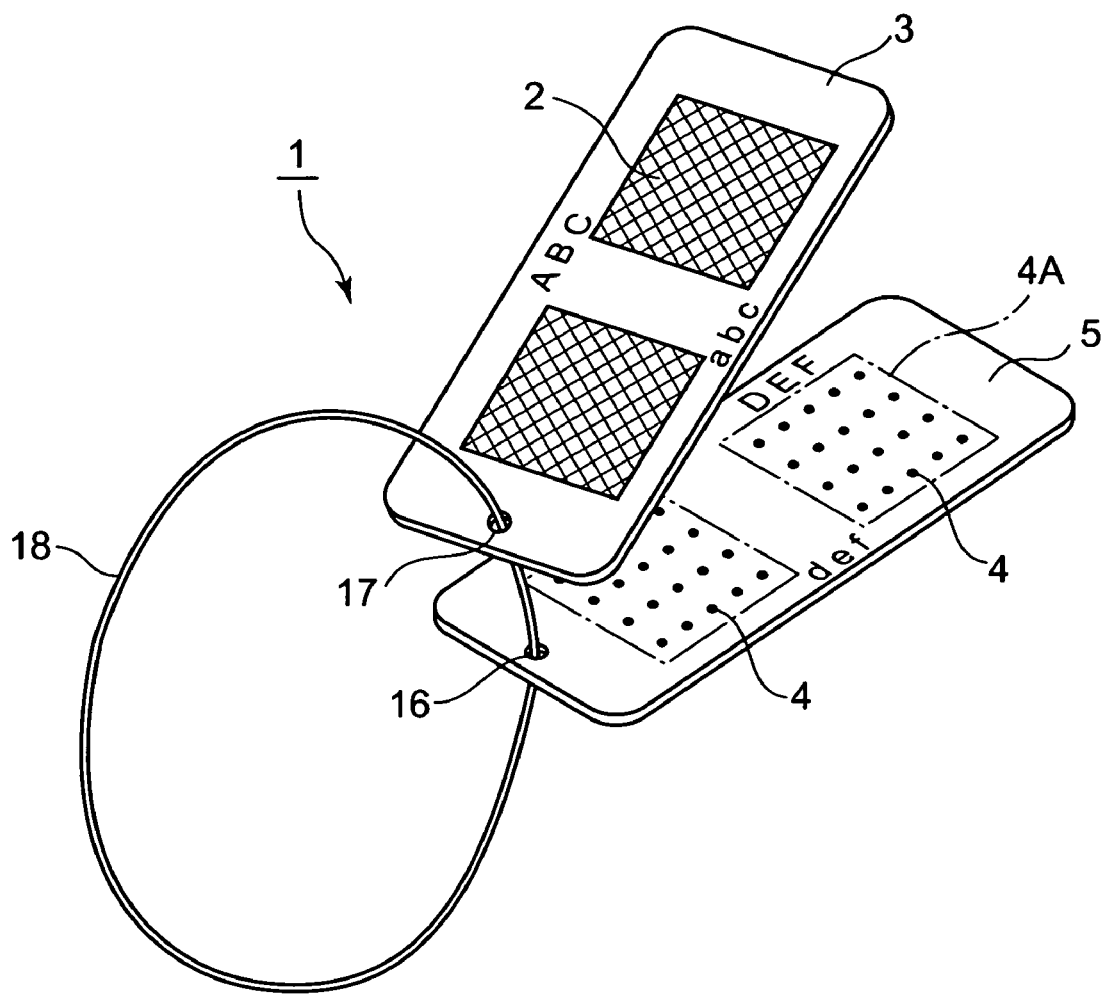
FIG. 10 is a perspective view of an optical medium according to a second embodiment of the present invention.
Figure 11:
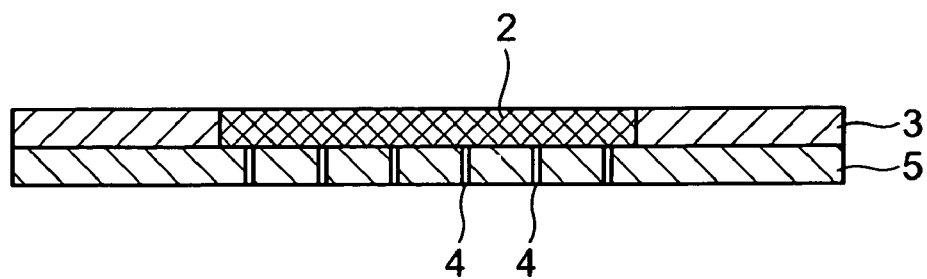
FIG. 11 is a cross-section of a state in which a light permeating sheet and a Fourier transform lens film, of an optical medium according to the present invention, are superimposed together.
Figure 12:
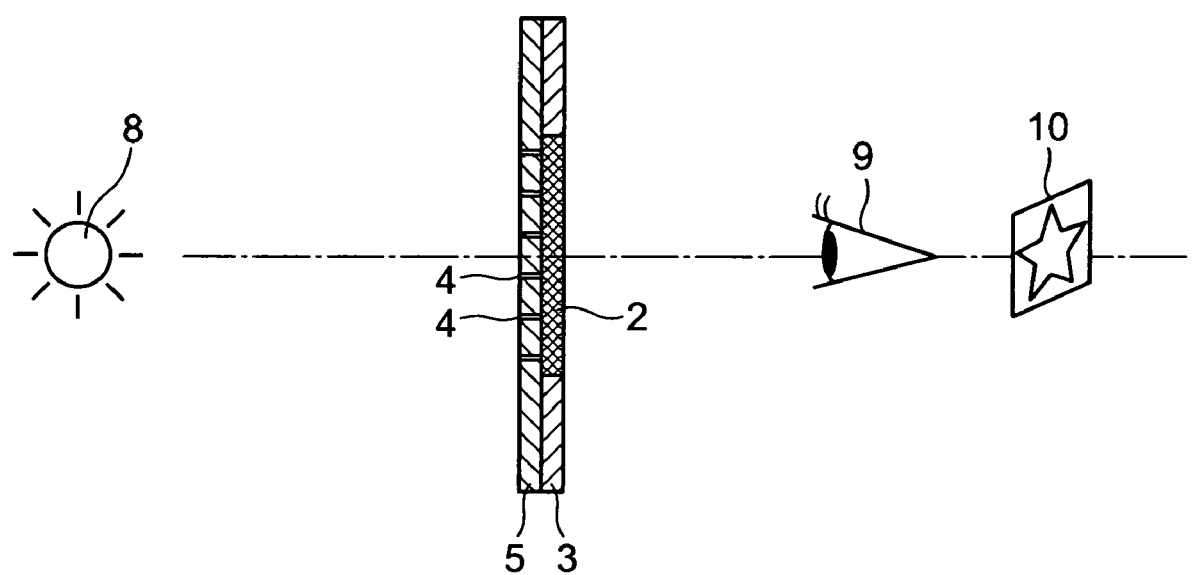
FIG. 12 is an explanatory view for illustrating a method of observing an optical image using an optical medium of the present invention.

FIG. 10 is a perspective view of an optical medium according to the second embodiment of the present invention, FIG. 11 is a cross-section of the optical medium according to the second embodiment of this invention, and FIG. 12 is an explanatory view for illustrating a method of observing an optical image using the optical medium of this invention.

As shown in FIG. 10, the optical medium 1 according to the second embodiment of this invention comprises a light permeating sheet 5 provided with a plurality of light permeating portions 4 through which light emitted from a light source can pass in a point-like manner, and a Fourier transform lens film 3 including Fourier transform lenses 2 on which optical images 10 to be observed are formed at a predetermined position.

Since the light permeating sheet 5 provided with light permeating portions 4 has the same outer shape as that of the Fourier transform lens film 3, when superimposed together, no part protrudes both in the lateral and transverse directions. In this case, the light permeating sheet 5 is provided separately from the Fourier transform lens film 3.

Each of the light permeating portions 4 formed in the light permeating sheet 5 comprises a fine aperture which is formed so that light can pass through the aperture in a point-like manner. Accordingly, when the light emitted from a light source 8 passes through each of the fine apertures, the Fourier transform lens 2 can be irradiated with points of light.

The light permeating portions 4 may be holes other than fine apertures, provided that the light can permeate the light permeating sheet 5 in a point-like manner and the Fourier transform lens 2 can be irradiated with points of light. For example, the light permeating portions 4 may be formed by printing at least one side of light permeating sheet 5 entirely with a dark color, especially a black color, to make the base material nontransparent, and creating a light permeating area through which light can pass in a point-like manner at predetermined positions of the entirely printed side.

In addition, by printing the side having small apertures with a black color, reflection of light can be reduced, thus providing more distinct points of light.

In the Fourier transform lens 2, concavo-convex portions are provided so that an optical image 10 can be observed on the lens 2 under predetermined conditions.

In the example shown in FIG. 10, while the Fourier transform lenses 2 are provided at two positions in the Fourier transform lens film 3, the number of the lenses is not limited to two, and the lenses 2 may be provided at a predetermined area or over the whole surface.

In the light permeating sheet 5 provided with a plurality of light permeating portions 4, a light permeating portion forming area 4A of light permeating portions 4 is arranged so that the Fourier transform lens 2 and the light permeating portions forming area 4A will be laid on each other when the Fourier transform lens film 3 and the light permeating sheet 5 are superimposed.

The Fourier transform lens 2 comprises fine concavo-convex portions by which a desired optical image 10 can be observed when viewing a point light source 8 through the Fourier transform lens 2. If using the Fourier transform lens 2 alone, however, the optical image cannot be observed unless utilizing a point light source, such as the sun, a candle, a spot light, fireworks or the like.

An optical medium 1 of the present invention changes light into points of light using the light permeating portions 4 of light permeating sheet 5, thus enabling to observe the optical image 10 without using any special point light source.

Both of the Fourier transform lens film 3 and the light permeating sheet 5 have a rectangular shape, and four corners of these film 3 and sheet 5 are rounded, so that the user would not be injured by these corners when possessing or utilizing optical medium 1.

Both of the Fourier transform lens film 3 and the light permeating sheet 5 have a thickness of from 80 to 2000 μm, and these materials have a shape retaining ability.

Moreover, through-holes 16, 17 are formed at each one end of the light permeating sheet 5 including a plurality of light permeating portions 4 and the Fourier transform lens film 3, and these through-holes 16, 17 are provided at positions which will be laid on each other when the light permeating sheet 5 and the Fourier transform lens film 3 are superimposed together.

Additionally, the optical medium 1 of the present invention has ring-like string 18 threaded in the through-holes 16, 17 respectively formed in the light permeating sheet 5 and the Fourier transform lens film 3, so that these sheet and film are linked together by the string.

Other than string 18, the ring-like material which is threaded in through-holes 16, 17 may include those formed of a metal or plastic, provided that the material is constructed to link the light permeating sheet 5 and the Fourier transform lens film 3 together.

Next, a method of observing an optical image using the optical media of the present invention will be described.

When a user utilizes the optical medium 1 to observe an image formed thereon, it is used in a state where the light permeating sheet 5 and the Fourier transform lens film 3 are superimposed together as shown in FIG. 11.

Subsequently, as shown in FIG. 12, the optical image 10 formed on Fourier transform lens 2 can be observed by viewing light emitted from the light source 8 toward the light permeating sheet 5 with eyes 9 on the side of the Fourier transform lens film 3 including the Fourier transform lens 2 through the light permeating portions 4.

In the observation method using the optical medium 1 of the present invention, by superimposing the Fourier transform lens film 3 including the Fourier transform lens 2 having an optical image formed thereon and the optical permeating sheet 5 provided with a plurality of light permeating portions 4 through which light can pass in a point-like manner then observing the optical image on the Fourier transform lens 2, a state in which the Fourier transform lens 2 is irradiated with light emitted from a point light source can be created without any special point light source, thereby eliminating a need of preparing for a point light source as in-the conventional cases.

The invention claimed is:

1. An optical medium, comprising a Fourier transform lens film including a Fourier transform lens on which an optical image is formed and which can provide visual confirmation of the optical image when light permeates the Fourier transform lens, and
a light permeating sheet arranged on the incident light side of the Fourier transform lens film and including a plurality of light permeating portions through which light can pass in a point-like manner.

2. An optical medium according to claim 1, wherein the Fourier transform lens film and the light permeating sheet are constructed separately.

3. An optical medium according to claim 1, wherein the Fourier transform lens film and the light permeating sheet are adhered together.

4. An optical medium according to claim 1, wherein the light permeating sheet has a recess on one surface, and the Fourier transform lens film is detachably fitted in the recess.

5. An optical medium according to claim 4, wherein the Fourier transform lens film is fixed in the recess of the light permeating sheet by a pressing sheet.

6. An optical medium according to claim 1, wherein at least one of the light permeating sheet and the Fourier transform lens film includes advertising information provided thereon.

7. An optical medium according to claim 6, wherein the advertising information provided on the light permeating sheet or the Fourier transform lens film is related to the contents of the optical image on the Fourier transform lens.

8. An optical medium according to claim 2, wherein the Fourier transform lens film and the light permeating sheet are linked together at their end portions by a linking member.

9. An optical medium according to claim 8, wherein the linking member comprises a ring-like linking member.

10. An optical medium according to claim 8, wherein either of the Fourier transform lens film and the light permeating sheet is of a rectangular shape, and four corners of the Fourier transform lens film and the light permeating sheet are formed into a rounded shape.

11. An optical medium according to claim 8, wherein either of the Fourier transform lens film and the light permeating sheet has a thickness of from 80 to 2000 μm and a shape retaining ability.

12. A method of using an optical medium, comprising a Fourier transform lens film including a Fourier transform lens on which an optical image is formed and which can provide visual confirmation of the optical image when light permeates the Fourier transform lens, and a light permeating sheet arranged on the incident light side of the Fourier transform lens film and including a plurality of light permeating portions through which light can pass in a point-like manner; the method comprising the steps of:

providing the Fourier transform lens, and the light permeating sheet arranged on the incident light side of the Fourier transform lens film; and observing the optical image formed on the Fourier transform lens of the Fourier transform lens film with eyes on the side of the Fourier transform lens film by utilizing incident light on the side of the light permeating sheet.

* * * * *